United States Patent
Shi et al.

(10) Patent No.: US 10,712,936 B2
(45) Date of Patent: Jul. 14, 2020

(54) FIRST ELECTRONIC DEVICE AND INFORMATION PROCESSING METHOD APPLICABLE TO FIRST OR SECOND ELECTRONIC DEVICE COMPRISING A FIRST APPLICATION

(71) Applicant: LENOVO (BEIJING) CO., LTD., Beijing (CN)

(72) Inventors: Donghai Shi, Beijing (CN); Hongzhe Qu, Beijing (CN); Lei Zhang, Beijing (CN); Yannan Chen, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 14/218,424

(22) Filed: Mar. 18, 2014

(65) Prior Publication Data
US 2014/0282086 A1 Sep. 18, 2014

(30) Foreign Application Priority Data

Mar. 18, 2013 (CN) .......................... 2013 1 0086529
Sep. 13, 2013 (CN) .......................... 2013 1 0418578

(51) Int. Cl.
*G06F 3/0488* (2013.01)
*H04L 12/58* (2006.01)
(Continued)

(52) U.S. Cl.
CPC ........ *G06F 3/04886* (2013.01); *H04L 51/046* (2013.01); *H04M 1/72552* (2013.01);
(Continued)

(58) Field of Classification Search
CPC ......... H04L 51/046; G06F 2203/04804; G06F 3/04886; G06F 2203/04803;
(Continued)

(56) References Cited

U.S. PATENT DOCUMENTS 7,716,376 B1 * 5/2010 Price .......................... G06F 1/12
709/248
8,701,020 B1 * 4/2014 Fulcher ................. G06F 3/0488
715/753
(Continued)

FOREIGN PATENT DOCUMENTS

| CN | 101384008 | 3/2009 |
| CN | 102447722 | 5/2012 |
| CN | 102763068 A | 10/2012 |

OTHER PUBLICATIONS

Chinese Patent Application No. 201310418578.4 Chinese Patent Office, First Office Action dated Jun. 15, 2016; 9 pages.
(Continued)

*Primary Examiner* — Kieu D Vu
*Assistant Examiner* — Roberto Borja
(74) *Attorney, Agent, or Firm* — Radlo & Su

(57) ABSTRACT

The present disclosure relates to an information processing method and information processing apparatus applicable to a first electronic device comprising a first application. The information processing method comprises receiving a first information sent from a second electronic device and associated with the first application in a process of the first electronic device being in communication with the second electronic device through the first application; receiving a second information sent from the second electronic device; and displaying the first information and the second information; wherein the first information is different from the second information, the first information includes communication information, and the second information includes information acquired by the second electronic device being in response to a detection of a predetermined operation or state on the second electronic device.

12 Claims, 7 Drawing Sheets

(51) Int. Cl.
*H04N 7/14* (2006.01)
*H04N 21/431* (2011.01)
*H04M 1/725* (2006.01)
(52) U.S. Cl.
CPC ......... *H04N 7/147* (2013.01); *H04N 21/4316* (2013.01); *G06F 2203/04803* (2013.01); *G06F 2203/04804* (2013.01)
(58) Field of Classification Search
CPC ........... H04N 21/8583; H04N 21/4316; H04N 7/147; H04M 1/72552
See application file for complete search history.

(56) References Cited

U.S. PATENT DOCUMENTS

| | | | | |
|---|---|---|---|---|
| 9,411,856 | B1* | 8/2016 | Stevens | G06F 17/30522 |
| 2006/0136298 | A1* | 6/2006 | Klein | G06Q 30/02 |
| | | | | 705/14.54 |
| 2007/0291107 | A1 | 12/2007 | Kang | |
| 2008/0307324 | A1* | 12/2008 | Westen | G06F 3/0486 |
| | | | | 715/753 |
| 2009/0319516 | A1* | 12/2009 | Igelman | G06Q 30/02 |
| 2010/0057466 | A1* | 3/2010 | Garg | H04M 1/72544 |
| | | | | 704/260 |
| 2010/0130257 | A1 | 5/2010 | Jang | |
| 2010/0228582 | A1* | 9/2010 | King | G06Q 30/02 |
| | | | | 705/14.66 |
| 2011/0179180 | A1* | 7/2011 | Schleifer | H04L 12/1818 |
| | | | | 709/227 |
| 2011/0202603 | A1* | 8/2011 | Mate | H04N 21/234318 |
| | | | | 709/205 |
| 2012/0011454 | A1* | 1/2012 | Droz | H04L 12/1827 |
| | | | | 715/758 |
| 2012/0290968 | A1* | 11/2012 | Cecora | G06Q 10/107 |
| | | | | 715/780 |
| 2012/0303452 | A1* | 11/2012 | Xue | H04L 12/5805 |
| | | | | 705/14.49 |
| 2013/0187861 | A1* | 7/2013 | Lavallee | G06F 9/543 |
| | | | | 345/173 |
| 2013/0191720 | A1* | 7/2013 | Simons | G06F 17/30882 |
| | | | | 715/234 |
| 2014/0019631 | A1* | 1/2014 | Namboodiri | H04L 65/60 |
| | | | | 709/231 |

OTHER PUBLICATIONS

English Text Translation of First Office Action for Chinese Patent Application No. 201310418578.4 Chinese Patent Office, First Office Action dated Jun. 15, 2016; 10 pages.
English Text Translation of Chinese Published Application No. CN101384008 (A), published on Mar. 11, 2009; 5 pages.
Chinese Patent Application No. 201310086529.5, Chinese Patent Office, First Office Action dated Sep. 27, 2016; 11 pages.
English Text Translation of First Office Action for Chinese Patent Application No. 201310086529.5, Chinese Patent Office, First Office Action dated Sep. 27, 2016; 16 pages.
English Text Translation of Chinese Published Application No. CN102763068 (A), published on Oct. 31, 2012; 13 pages.
Chinese Patent Application No. 201310086529.5, Chinese Patent Office, Second Office Action dated May 18, 2017; 10 pages.
English Text Translation of Second Office Action for Chinese Patent Application No. 201310086529.5, Chinese Patent Office, Second Office Action dated May 18, 2017; 13 pages.
English Text Translation of Chinese Published Application No. CN 102447722 (A), Zhang Ming, published on May 9, 2012; 4 pages.

* cited by examiner

FIRST ELECTRONIC DEVICE AND INFORMATION PROCESSING METHOD APPLICABLE TO FIRST OR SECOND ELECTRONIC DEVICE COMPRISING A FIRST APPLICATION

CROSS REFERENCE TO RELATED APPLICATIONS

This application claims the benefit under 35 U.S.C. § 119(a) of Chinese Patent Application No. 201310086529.5, filed on Mar. 18, 2013, and Chinese Patent Application No. 201310418578.4, filed on Sep. 13, 2013, the entire disclosures of which are incorporated by reference herein in their entireties.

TECHNICAL FIELD

The present disclosure relates to a field of information processing technology, particularly to information processing method and information processing apparatus.

BACKGROUND

With the development of communication technology, communication application including text communication, voice communication, video communication, and the like, there is an increasingly wide utilization of communication applications. In general, a communication application realizes the purpose of communication by forwarding communication information between two or more users. A user can usually only receive communication information sent from a counterparty user through the communication application and send communication information produced by the user to the counterparty user, resulting in a relatively single user experience.

On the one hand, in a case of two or more electronic devices being in a video communication state, if a user needs to send a text message to a counterparty user, he/she must firstly exit from the video communication state, and then can send the text message. After the sending of the text message has been completed, if the user still needs to continue the video communication, he/she needs to reestablish a video communication connection, thus causing a tedious operation.

On the other hand, in the processes of communication, a large amount of data will be produced, such as text data, voice data, video data, and the like. In the prior art, when forwarding these data to a communication counterparty during the communication process to realize the purpose of communication, the data is not further utilized.

Therefore, an information processing method and information processing apparatus being capable of conveniently delivering and displaying a wide variety of information between two or more electronic devices is needed.

SUMMARY

Given the above situation, in embodiments of the present disclosure, an information processing method and an information processing apparatus, being capable of not only performing communication among a plurality of users but also sharing information recommended by any one of the plurality of users among the plurality of users, are provided. The information processing method and information processing apparatus ensure that the purpose of sharing information in the process of communication is realized, thus enriching the user's experience in communication.

Further, the information processing method and information processing apparatus of the present disclosure can utilize communication information produced in the process of communication, for example, producing associated information being suitable for the user, so as to further enhance the application value of communication and enrich the user's experience.

According to an aspect of the present disclosure, an information processing method applicable to a first electronic device comprising a first application is provided. The information processing method comprises receiving a first information sent from a second electronic device and associated with the first application in a process of the first electronic device being in communication with the second electronic device through the first application; receiving a second information sent from the second electronic device; and displaying the first information and the second information; wherein the first information is different from the second information, the first information includes communication information, and the second information includes information acquired by the second electronic device being in response to a detection of a predetermined operation or state on the second electronic device.

In an example, the second electronic device comprises the first application and a second application being different from the first application, the second application being in an active state, and the second information is acquired from the second application by the second electronic device being in response to a detection of a predetermined operation performed by a user of the second electronic device on the second application.

In an example, the information processing method further comprises receiving a third information sent from a server and displaying the third information.

In an example, a display interface of the first application comprises a communication interface and an associated information interface, and said displaying the first information, the second information, and the third information comprises displaying the first information in the communication interface of the first application; and displaying the second information and the third information in the associated information interface of the first application.

In an example, the first information is communication image information continuously received from the second electronic device, and the second information is a text message received from the second electronic device; and said displaying the first information and the second information comprises displaying the communication image information in a first area of a display interface of the first application; and displaying the text message in a second area of the display interface of the first application, the second area being a subarea of the first area.

In an example, said displaying the communication image information and the text message further comprises determining a first display parameter of a part of the communication image information in the second area; determining a second display parameter of the text message according to the first display parameter, a difference between the second display parameter and the first display parameter exceeding a threshold; and displaying the communication image information according to the first display parameter, and displaying the text message according to the second display parameter.

In an example, after the text message is displayed in the second area of the display interface, the information processing method further comprises displaying the text message and a text message input box when an instruction for performing a predetermined operation on the text message is received.

In an example, said displaying the text message in the second area of the display interface comprises identifying a predetermined object in the first area; determining a corresponding position of the predetermined object as the second area; and displaying the text message in the second area.

According to another aspect of the present disclosure, an information processing method applicable to a second electronic device comprising a first application is provided. The information processing method comprises sending a first information associated with the first application to a first electronic device in a process of the second electronic device being in communication with the first electronic device through the first application; detecting a predetermined operation or state on the second electronic device; acquiring a second information in response to the predetermined operation or state; and sending the second information to the first electronic device; wherein the first information is different from the second information, the first information includes communication information.

In an example, the second electronic device further comprises a second application being different from the first application, the second application being in an active state, and said detecting a predetermined operation or state on the second electronic device comprises detecting a predetermined operation performed by a user of the second electronic device on the second application; said acquiring the second information comprises acquiring the second information from the second application in response to the predetermined operation.

In an example, the first information is communication image information, the second information is a text message, and the predetermined operation produces a text input instruction; and said acquiring the second information in response to the predetermined operation comprises displaying a text message input interface; receiving a text message sending instruction; and acquiring the text message input by the user on the text message input interface as the second information.

In an example, the first information is displayed in a first interface, the first interface is a video communication interactive interface, and said displaying a text message input interface comprises displaying the text message input interface in a first area of the first interface.

In an example, said detecting a predetermined operation or state on the second electronic device comprises detecting a current network state of the second electronic device; and producing a text input instruction when the current network state of the second electronic device does not satisfy a predetermined condition.

According to another aspect of the present disclosure, an information processing apparatus applicable to a first electronic device comprising a first application is provided. The information processing apparatus comprises a first information receiving unit for receiving a first information sent from a second electronic device and associated with the first application in a process of the first electronic device being in communication with the second electronic device through the first application; a second information receiving unit for receiving a second information sent from the second electronic device; and a display unit for displaying the first information and the second information; wherein the first information is different from the second information, the first information includes communication information, and the second information includes information acquired by the second electronic device being in response to a detection of a predetermined operation or state on the second electronic device.

In an example, the second electronic device comprises the first application and a second application being different from the first application, the second application being in an active state, and the second information is acquired from the second application by the second electronic device being in response to a detection of a predetermined operation performed by a user of the second electronic device on the second application.

In an example, the information processing apparatus further comprises a third information receiving unit for receiving a third information sent from a server; wherein the display unit is further used for displaying the third information.

In an example, a display interface of the first application comprises a communication interface and an associated information interface, and the display unit displays the first information in the communication interface of the first application and displays the second information and the third information in the associated information interface of the first application.

In an example, the first information is communication image information continuously received from the second electronic device, and the second information is a text message received from the second electronic device; and the display unit displays the communication image information in a first area of a display interface of the first application and displays the text message in a second area of the display interface of the first application, the second area being a subarea of the first area.

In an example, the display unit further comprises a first determination unit for determining a first display parameter of a part of the communication image information in the first area; a second determination unit for determining a second display parameter of the text message according to the first display parameter, a difference between the second display parameter and the first display parameter exceeding a threshold; a first display subunit for displaying the communication image information according to the first display parameter; and a second display subunit for displaying the text message according to the second display parameter.

In an example, the information processing apparatus further comprises an operation receiving unit for receiving an instruction for performing a predetermined operation on the text message; wherein the display unit displays a text message input box when the operation receiving unit receives an instruction for performing a predetermined operation on the text message.

In an example, the display unit comprises an object identification unit for identifying a predetermined object in the first area and determining a corresponding position of the predetermined object as the second area.

The information processing method and information processing apparatus of the embodiments in the present disclosure can receive communication information sent from the communication counterparty user in the process of communication as well as information being different from the communication information, for example, the shared information that the communication counterparty user wants to share, so as to be able to realize the purpose of sharing information in the process of communication, thus enriching the user's experience in communication.

More particularly, in a case of performing a video communication, a received video communication image can be displayed together with a text message; further, a text message input box can be displayed according to the needs, and the text message is sent at the same time when the video communication is performed to realize the purpose of delivering the text message without exiting from the video communication, thus simplifying the operation.

Further, the information processing method and information processing apparatus of the present disclosure can utilize communication information produced in the process of communication, for example, producing associated information being suitable for a communication user and sending the associated information to the communication user, so as to further enhance application value of the communication, thus further enriching the user's experience.

Other characteristics and advantages of the present disclosure are explained in the following text of the specification, and may be partially obvious from the specification or may be known by implementing the present disclosure. The purpose and other advantages of the present disclosure can be realized and obtained by the structure particularly indicated in the specification, claims, and drawings that are attached to the specification.

BRIEF DESCRIPTION OF THE DRAWINGS

In order to more explicitly specify the technical solutions in the embodiments of the present disclosure or the prior art, below will be a brief introduction of the accompanying drawings needed to be used in describing the embodiments or the prior art. Obviously, the accompanying drawings described below are just the embodiments of the present disclosure, and other drawings can be obtained according to the drawings provided herein for those skilled in the art without paying any inventive labor.

DETAILED DESCRIPTION

Figure 1:
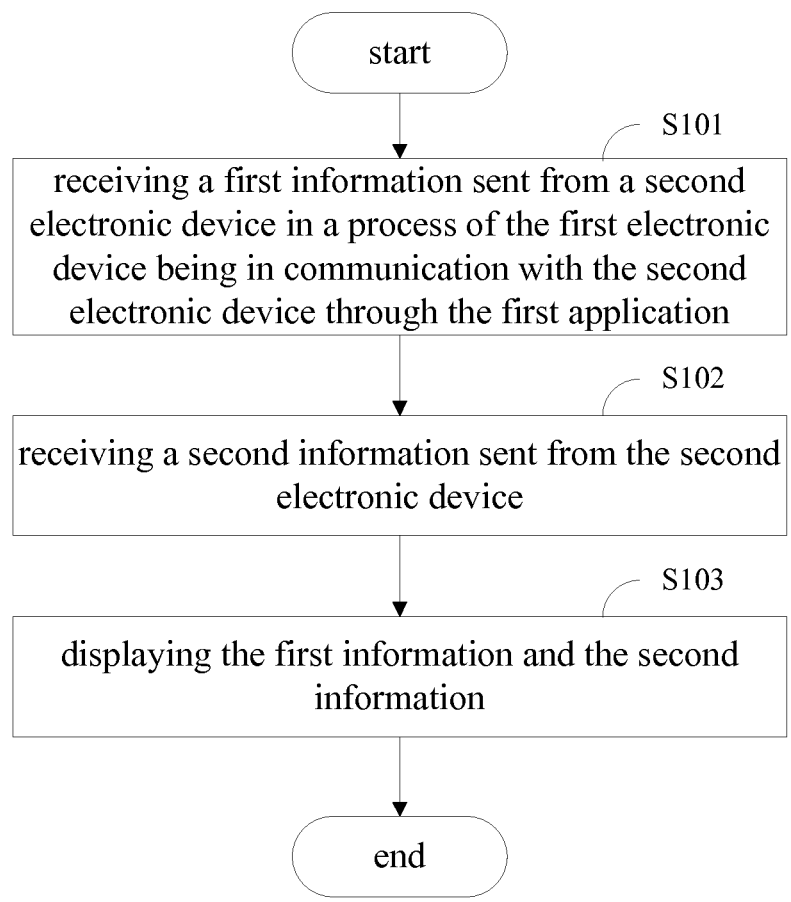
FIG. 1 is a flowchart illustrating an information processing method according to an embodiment of the present disclosure.

The technical solutions in the embodiments of the present disclosure are clearly and completely described in combination with the accompanying drawings in the embodiments of the present disclosure. Obviously, the embodiments described herein are just a part of the embodiments of the present disclosure rather than all the embodiments of the present disclosure. Based on the embodiments of the present disclosure, all the other embodiments obtained by those skilled in the art without paying any inventive labor fall into the protection scope of the present disclosure.

The information processing method and information processing apparatus according to the embodiments of the present disclosure are applicable to an environment in which a first electronic device is in communication with a second electronic device. The first electronic device and the second electronic device may be electronic devices having a communication function, such as a fixed-line telephone, a mobile phone, a tablet personal computer, a personal computer and the like. The communication may be traditional voice communication (for example, via a fixed-line telephone), or may be video communication (for example, via a video chat application), or may also be text communication (for example, via an instant message (text chat) application. The types of the first electronic device and the second electronic device may be either same or different.

In addition, the communication between the first electronic device and the second electronic device can be performed via a server (hereinafter appropriately called as a remote server) over a network such as Internet. That is, one of the first electronic device and the second electronic device sends the communication information to the server, and the server then forwards the communication information to the other one of the first electronic device and the second electronic device. Alternatively, the first electronic device and the second electronic device may directly communicate with each other without any server.

In the description below, the embodiments of the present disclosure are described by taking the communication between the two devices of the first electronic device and the second electronic device as an example. However, those skilled in the art can understand that, the information processing method and information processing apparatus can be applicable to a situation of communication between more than two electronic devices.

In addition, in the description below, the embodiments of the present disclosure are applicable to a first electronic device. However, those skilled in the art can understand that the information processing method and information processing apparatus in the embodiments of the present disclosure can be applicable to any one of the first electronic device and the second electronic device.

Below will be a description of the information processing method according to an embodiment of the present disclosure by referring to FIG. 1.

As described above, the information processing method is applicable to the first electronic device comprising a first application. The first application has for example a communication function. That is, the first application may be a communication application. As described above, the communication may comprise at least one communication mode of text communication, voice communication or audio/video (hereinafter referred to as video communication) communication.

First, in step S101, the information processing method receives a first information sent from the second electronic device and associated with the first application in a process of the first electronic device being in communication with the second electronic device through the first application. The first information includes communication information, for example, at least one of the text communication information, voice communication information or video communication information as described above.

Next, in step S102, the information processing method receives a second information sent from the second electronic device. The second information is different from the first information.

More particularly, the second information can include information acquired by the second electronic device being in response to a detection of a predetermined operation or state on the second electronic device.

As an example, the second information may comprise information acquired by the second electronic device being in response to a detection of a predetermined operation of a second user of the second electronic device. That is, the second information is information apart from the communication information that the second user of the second electronic device wants to share with a first user of the first electronic device in the process of the second user of the second electronic device being in communication with the first user of the first electronic device.

As another example, the second information may further comprise information acquired by the second electronic device being in response to a current network state of the second electronic device.

The second electronic device may acquire the second information through the same first application installed therein, or may acquire the second information through a second application being different from the first application. That is, the second user can share through the first application in the process of communication through the same application; alternatively, the second user can share through an application other than the first application in the process of communication through the first application. Correspondingly, in the case that the second user shares through a second application other than the first application in the process of communication through the first application, the first electronic device may also include or be installed with the second application. Of course, according to the actual situation, the first electronic device may not include or be installed with the second application.

Later, the second information and the processing that the second electronic device acquires the second information are described in detail in the information processing method at the sending side by referring to FIGS. 6-8.

It is needed to point out that the processing sequence for steps S101 and S102 is not limited to the sequence as shown in FIG. 1. Alternatively, steps S101 and S102 may be performed in any appropriate sequence (such as in parallel or in a reverse sequence).

Next, in step S103, the information processing method displays the first information and the second information.

The above is the description of the information processing method according to the embodiment of the present disclosure.

The information processing method according to the embodiment of the present disclosure can receive the communication information sent from the communication counterparty user in the process of communication as well as the information being different from the communication information, for example, the shared information that the communication counterparty user wants to share, so as to be able to realize the purpose of sharing information in the process of communication, thus enriching the user's experience in communication.

In addition, in the information processing method according to the embodiment of the present disclosure, in the case of the first electronic device being in communication with the second electronic device via a server, except the shared information sent from the second electronic device can be received, the information sent from the server, i.e., a third information described below, can also be received.

That is, in the embodiment of the present disclosure, the information processing method receives the third information from the server and displays the third information in the process of the first electronic device being in communication with the second electronic device. The third information is produced by the server based on the communication information of the first electronic information and the second electronic device.

In particular, for example, in the case that the second electronic device sends the communication information (the first information) to the server so as to be forwarded to the first electronic device via the server or in the case that the first electronic device sends the communication information (the first information) to the server so as to be forwarded to the second electronic device via the server, the server can determine a processing object and a sending object based on the communication information. Next, the server makes an analysis on the processing object to acquire associated information, which is associated with the processing object (i.e., the third information described above), and sends the associated information to the sending object. The sending object may be the first user of the first electronic device as described above. Alternatively, the sending object may be the second user of the second electronic device as described above. In addition, the sending object may be users other than the first and second users, whose user information is stored in the server.

More particularly, a determination of the processing object may be realized by detecting an input operation voluntarily performed by the user, or may be realized through automatically analyzing and identifying the communication information by the server.

In particular, in an embodiment, the communication comprises video communication, and the communication information comprises information of a video picture. In such a case, one of the first user and the second user assigns the processing object by performing the input operation on the video picture. Correspondingly, the server determines the processing object assigned by the user by obtaining the information of the input operation performed by the user on the video picture.

More particularly, the server receives input track information sent from at least one of the first electronic device and the second electronic device. The input track information is produced through detecting the user's input operation by at least one of the first electronic device and the second electronic device. The input track information may comprise information of a series of tracks formed by a plurality of track points or comprise information of a track formed by a single track point. For example, in a case that the electronic device comprises a touch unit and the user performs the input operation through the touch unit, the input track information may be information produced by detecting the user's sliding gesture or be information produced by detecting the user's clicking operation.

In addition, the electronic device of the first electronic device and the second electronic device that sends the input track information can also send information such as a size of a display picture of the electronic device and the like.

Then, the server determines the processing object based on the input track information.

More particularly, for example, in a first example, for example, the user of the first electronic device can select an area in the video picture. Correspondingly, the first electronic device forms the input track information by detecting the input operation used for selecting an area in the video picture. Then, the first electronic device sends the input track information and the electronic device parameter information of the first electronic device to the server. Next, the server determines a part of the video picture corresponding to the area as the processing object.

In a second example, for example, the user of the first electronic device can click a particular position in the video picture. Correspondingly, the first electronic device forms the input track information by detecting the clicking operation used for clicking the video picture. Then, the first electronic device sends the input track information to the server.

Next, the server determines to which position of the video picture (i.e., the particular position) the input track information corresponds based on the input track information. Then, the server segments the video picture, to obtain a part of the video picture covering the particular position and determine the part of the video picture as the processing object. Likewise, the server performs the operations described above based on a variety of image segmentation algorithms known in the art, details omitted.

In a third example, the server can determine the processing object by combining the voluntary input of the user with the automatic analysis of the server.

In particular, the server can identify images of the video picture, to determine a plurality of candidate objects. Then, the server can send the plurality of candidate objects to at least one of the first electronic device and the second electronic device for the user's selection. The at least one of the first electronic device and the second electronic device detects the user's selection operation on at least one of the plurality of candidate objects, produces corresponding input track information and sends the input track information to the server.

Thus, based on the selection information (i.e., the input track information described above) obtained by detecting the selection operation, the server determines the selected at least one candidate object as the processing object.

Below will be a description of the situation of determining the processing object by automatically analyzing and identifying the communication information.

In particular, in a first example, the communication information comprises information of a still picture. In such a case, the server identifies the still picture, to segment the still picture into a plurality of areas. Those skilled in the art can adopt a variety of algorithms to perform image segmentation, details omitted. Then, the server determines a target area from the plurality of areas based on a predetermined standard. Those skilled in the art can adopt various kinds of standards and corresponding algorithms to determine the target area, details omitted.

After the target area is determined, the server determines the processing object based on the target area. In particular, for example, the server can analyze the video picture of the target area to determine the processing object. For example, the server can determine the type of the object by identifying the video picture of the target area, to determine the processing object. For another example, the server can perform a fuzzy matching between the video picture of the target area and images prestored in an information base, to determine the processing object. Of course, the method for determining the processing object based on the target area is just for illustration. Other diversifies of methods known for those skilled in the art can be adopted to determine the processing object, details omitted.

In a second example, the communication information comprises information of a dynamic picture. In such a case, the server can identify the dynamic picture, to identify a particular action performed by the user in the process of communication. For example, the server can identify a dynamic picture composed of a plurality of timely-continuous frames in a way similar to that described above, to identify actions performed by the user during this time period.

Then, the server can determine the processing object based on the particular action. For example, the server can determine the processing object according to the particular action based on a table of association relationship between a prestored action and the processing object.

In a third example, the communication information comprises audio information. In such a case, the server can identify the audio, so as to determine the processing object.

More particularly, for example, the server can determine whether there is an audio segment matching with a predetermined keyword in the audio. When it is determined that there is an audio segment matching with a predetermined keyword in the audio, the server determines the audio segment as the processing object.

For another example, the server can make a semantic analysis on the audio and determine the processing object based on a result of the semantic analysis.

Of course, the server can utilize a variety of algorithms known in the art to identify the audio, details omitted.

In addition, the server according to the embodiment of the present disclosure can combine the voluntary input of the user with the automatic identification of the electronic device. In particular, in a fourth example, the server determines a plurality of candidate objects based on the communication information, and sends the plurality of candidate objects to at least one of the first electronic device and the second electronic device. The electronic device having received the candidate objects detects the user's selection operation used for selecting at least one of the candidate objects, and sends the selection information produced by the selection operation to the server, the server receives the selection information, and determines the selected at least one candidate object as the processing object based on the selection information.

In a fifth example, the communication information comprises text message. In such a case, the server can identify the text, so as to determine the processing object.

More particularly, for example, the server can determine whether there is a text segment matching with a predetermine keyword in the text. When it is determined that there is a text segment matching with a predetermined keyword in the text, the server determines the text segment as the processing object.

For another example, the server can make a semantic analysis on the text and determine the processing object based on a result of the semantic analysis. Of course, the server can utilize a variety of algorithms known in the art to identify the text, details omitted.

The above is the description of an illustrative mode that the server determines the processing object.

In another aspect, the server determines the sending object based on the communication information.

In particular, in an embodiment, for each of the plurality of users comprising the first user of the first electronic device and the second user of the second electronic device, the server stores relationship information indicating the relationship between the user and other users. The relationship information is for example comprised in the user information of each user.

The relationship between the user and other users may be either one-to-one or one-to-many. In addition, the relationship between the user and other users may be either unidirectional or bidirectional. Of course, the user may not have any relationship with other users. In such a case, the relationship of the user may be for example null.

For example, in applications concerning so-called social friends, the relationship information may comprise information having for example a bidirectional relationship with the user, such as friend information of friends of the user. The relationship information may also comprise information having for example a unidirectional relationship with the user, such as follower information of the users followed by the user, or fans information of the fans following the user.

The server stores the relationship information for example in a database of the server in a variety of forms for example a mapping table or a chain table and the like, Thus, the server determines the target user from the plurality of users based on the communication information.

In particular, for example, in a case of audio communication or audio/video communication comprising the audio communication, the server can make a semantic analysis on the communication information of the audio communication. In a case of text communication, the server can make a text analysis on the text message of the text communication, so as to determine the target user from the plurality of users.

More particularly, the target user determined by the analysis may be one of the first user of the first electronic device and the second user of the second electronic device, or may also be other users involved in the process of communication except the first user or the second user. For example, in a first embodiment, the server can determine the user who shows interest to the processing object described above in the process of communication (such as one of the first user and the second user) as the target user. For another example, the server can determine the user involved in the process of communication, which is possible to show interest to the processing object described above (such as other users mentioned by the first user and/or the second user) as the target user.

Then, the server obtains the relationship information of the target user as described above, and determines the user whose relationship with the target user satisfies a predetermined condition as the sending object based on the relationship information of the target user.

In particular, the server can predetermine various kinds of predetermined conditions (i.e., strategies) for determining the sending object. Taking the above social applications as an example, the server can predetermine to determine the users having a bidirectional following relationship with the target user (for example, friends) or the user having a unidirectional following relationship with the target user (for example, fans or following users) as the sending object. Of course, the predetermined conditions described above are just for illustration. Those skilled in the art can design different predetermined conditions according to the needs, all of which fall into a scope of the present disclosure.

The above is a description of one mode for determining the sending object. Below will be a description of another mode for determining the sending object.

In this embodiment, user information of a plurality of users is stored in the server. The user information at least comprises identification of the users, for example, name information, user name information, nickname information, and the like of the users.

Thus, the server determines whether there is an identification matching with the communication information based on the communication information.

In particular, for example, in a case of audio communication or audio/video communication comprising the audio communication, the server can perform an audio identification on the communication information of the audio communication, so as to determine whether the communication information matches with one of the plurality of identifications. In a case of text communication, the server can perform a text matching on the communication information of the text communication, so as to determine whether the communication information matches with one of the plurality of identifications.

When it is determined that there is an identification matching with the communication information, the server determines the sending object based on the identification. In an example, the server determines the user corresponding to the identification as the sending object. In another example, the server determines the user whose relationship with the user corresponding to the identification satisfies the predetermined condition as the sending object. More particularly, the server obtains the user information (more particularly, the relationship information) of the user corresponding to the identification. Then, the server determines the user whose relationship with the user corresponding to the identification satisfies the predetermined condition as the sending object based on the relationship information.

The above is the description of an illustrative mode that the server determines the sending object.

After the sending object and the processing object are determined as described above, the server analyzes the processing object to obtain the association information associated with the processing object.

In particular, in an embodiment, the server prestores object information of a plurality of objects and the object information of each of the objects is stored in a way being associated with attribute information. The attribute information is used for representing the attribute of the object.

Thus, the server analyzes the processing object based on for example the association relationship between the object information and the attribute information, so as to determine the attribute of the processing object. Then, the server determines corresponding attribute information in the stored attribute information based on the attribute of the processing object. For example, the attribute information can be divided into different categories. The server can determine the attribute information in the stored attribute information that belongs to a category being same as or corresponding to that of the attribute of the processing object as the corresponding attribute information. Next, the server determines the object information associated with the corresponding attribute information as the associated information.

In another embodiment, the attribute information comprises information of a plurality of attributes. After determining an attribute of the processing object, the server can directly determine information of other attributes of the processing object as the associated information.

It is needed to point out that the mode that the server determines the associated information as described above is just for illustration. Those skilled in the art can adopt other various of modes to acquire the associated information.

Then, the server sends the associated information to the sending object. More particularly, the server can send the associated information to the sending object (i.e., the user) in a predetermined manner. For example, the server can send the associated information to account, email address and telephone number and the like of the sending object. Information of account, email address and telephone number and the like is prestored, as a part of the user information, in the server.

In this embodiment, it is assumed that the server determines the first user of the first electronic device as the sending object and sends the associated information to the first electronic device.

Thus, the information processing method in the embodiment of the present disclosure can not only receive the communication information sent from the communication counterparty user, as well as the shared information shared by the communication counterparty user, but it can also receive the associated information being suitable for the communication user and determined by the server's analysis on the communication information to be able to utilize the communication information produced in the process of communication in order to realize the purpose of communication and further enhance the application value of the communication. Thus, it greatly enriches the user's experience.

More particularly, the information processing method in the embodiment of the present disclosure can utilize the communication information, for example, producing the information to which the user involved in the process of communication explicitly shows interest or is possible to shown interest, and providing the information to the user or another user having a particular relationship with the user, so as to provide a new manner of utilizing the communication information, which makes full use of the communication information, thus greatly enriching the user's experience.

In addition, it is needed to point out that, those skilled in the art can understand that a part of processing at the server side may also be appropriately performed at the electronic device side with an increasing improvement of the processing capability of the electronic device. For example, the first electronic device and/or the second electronic device can determine the processing object or even determine the associated information, which is associated with the processing object based on the communication information, and sends the determined processing object and/or the associated information to the server.

In another embodiment of the present disclosure, after the first information (communication information), the second information (shared information) and the third information (associated information) are obtained as described above, the information processing method displays the above various information in a particular manner. In particular, the display interface of the first application can be designed to comprise the communication interface and the associated information interface. Thus, the information processing method can display the first information in the communication interface of the first application, and display the second information and the third information in the associated information interface of the first application.

In such a way, the communication information and the information apart from the communication information (shared information and associated information) are displayed in the display interface of the same application, but they are displayed in different areas of the display interface and may not be interfered with each other, so as to not cause trouble in the user's communication or acquisition of the shared information (as well as the possible associated information).

Below will be a description of a specific implementation of the information processing method according to the embodiment of the present disclosure with a specific example.

In particular, in this example, the first electronic device is in video communication with the second electronic device. The information processing method according to the embodiment of the present disclosure can be applicable to the first electronic device, and can be in particular used as a text message receiving method. The first electronic device at least comprises a display unit and a communication unit, and the display unit and the communication unit in the first electronic unit are referred to as a first display unit and a first communication unit in order to make it distinctive from those in the second electronic device. The first electronic device can establish a communication connection with the second electronic device via the first communication unit.

The first information may be communication image information continuously received from the second electronic device, may be voice information continuously received from the second electronic device, or may even be call-established waiting information fed back from the second electronic device. The second information is text message received from the second electronic device. The text message may be text manually input by the user of the second electronic device (i.e., simultaneously realizing the audio communication and text communication), or may be text sent by the user of the second electronic device through the sharing described above to the first electronic device.

Figure 2:
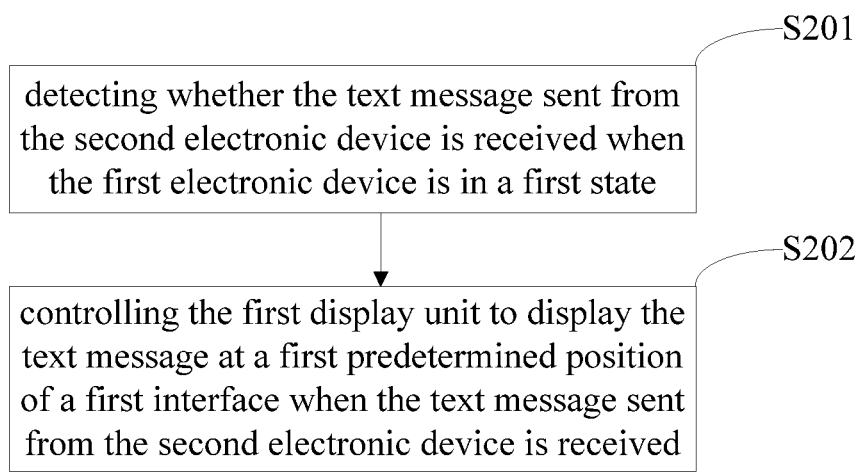
FIG. 2 is a flowchart illustrating a text message receiving method according to an embodiment of the present disclosure.

As shown in FIG. 2, in step S201, it is detected whether the text message sent from the second electronic device is received when the first electronic device is in a first state, wherein the first state is an interactive state in which the first electronic device is in video communication with the second electronic device.

The video communication interactive state comprises a first substate and a second substate. The first substate is a state in which the first electronic device has established video communication with the second electronic device, and data comprising at least one of voice and image can be sent between the first electronic device and the second electronic device. The second substate is a state in which a video call request is sent to the second electronic device and a video call is waited to be established with the second electronic device.

A second text message collectively refers to the text message sent from the second electronic device to the first electronic device, instead of particularly referring to a piece of text message.

In step S202, the first display unit is controlled to display the text message at a first predetermined position in a first interface when the text message sent from the second electronic device is received.

The first interface is the video communication interactive interface corresponding to the first state. The video communication interactive interface comprises a video call interface corresponding to the first substate and a video call link request interface corresponding to the second substate.

When the first interface is the video call interface, as described above, the first display unit is controlled to display the text message at the first predetermined position in the first interface, which is in particular implemented by controlling the first display unit to display the text message in the video call interface.

When the first interface is the video call link request interface, as described above, the first display unit is controlled to display the text message at the first predetermined position in the first interface, which is in particular implemented by controlling the first display unit to display the text message in the video call link request interface.

In this example, the information processing method can display the communication image information in a first area of the display interface of the first application, and display the text message in a second area of the display interface of the first application. The second area is a subarea of the first area. In other words, the information processing method can display the communication image information and the text message in an overlapped manner, for example, setting the image produced based on the communication image information as the background image of at least one part of the text message display window.

Thus, the information processing method can display information as much as possible in a case of limited display area of the electronic device or limited display window size of the first application.

Alternatively, the text message can be displayed in a bubble message mode. The text message is avoided from covering the image in the first interface, so that the text message can be displayed at the lower left corner or at the lower right corner of the first interface. Since the text message being displaying at which position of the first interface does not affect the implementation of the embodiment of the present disclosure, the embodiment of the present disclosure thus does not make particular limitations thereto.

Further, in order to enable the display effect of this overlapped display to the better, in the embodiment of the present disclosure, the information processing method can determine a first display parameter of a part of communication image information in the second area. The first display parameter is for example illuminance information, transparency information and gray scale information and the like of the part of communication image information. In the embodiment of the present disclosure, the first display parameter may be an average display parameter determined based on all pixels in the part of communication image information, or may be a display parameter determined based on particular pixels (such as extreme pixels) in the part of communication image information.

Next, the information processing method determines a second display parameter of the text message according to the first display parameter, and a difference between the second display parameter and the first display parameter exceeds a threshold. Then, the information processing method displays the communication image information according to the first display parameter, and displays the text message according to the second display parameter.

That is, the information processing method distinctively displays the communication image information and the text message for example with different gray scale, illuminance, or transparency, such that the user can easily distinguish the two types of information in a case of the overlapped display, instead of causing difficulty in identifying.

In the text message receiving method of this example, the text message sent from the second electronic device can be displayed in the video communication interactive interface. The user of the first electronic device can look up the text message sent from the second electronic device without exiting from the current video communication interactive interface, thus simplifying the operation steps.

It can be understood that, the first interface can always display the text message, or display the text message for a period of time and stop displaying the text message in a case that the user does not perform any operation on the text message during this period of time, that is, the text message disappears from the first interface.

Figure 3:
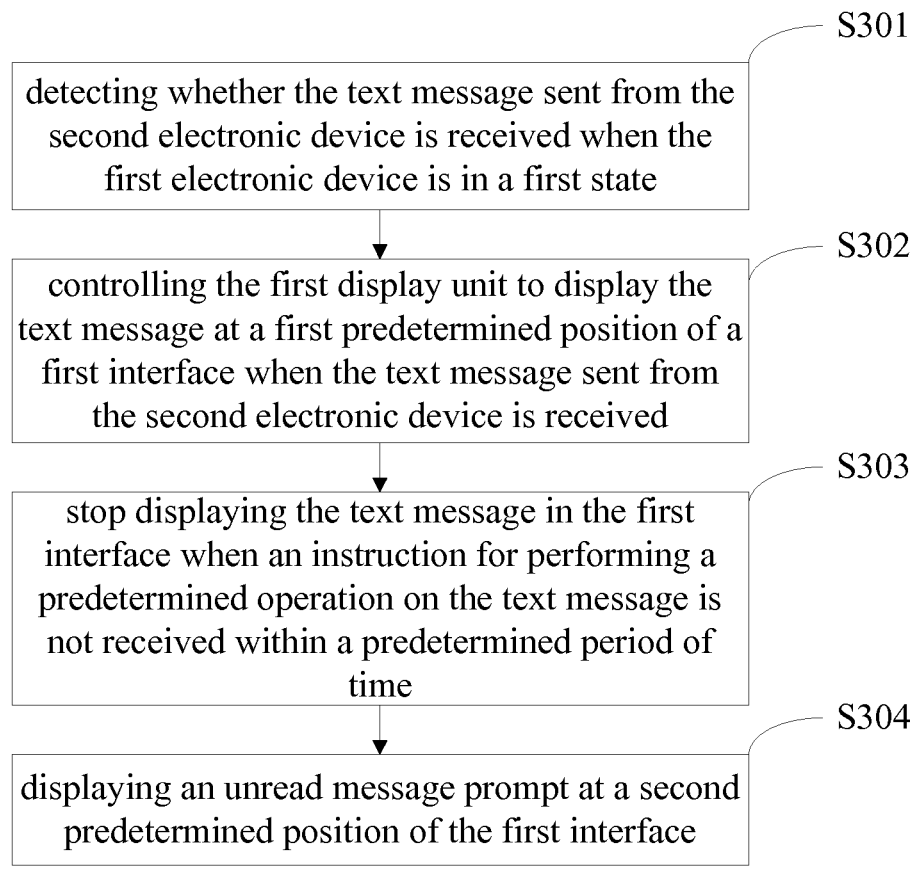
FIG. 3 is an extended flowchart illustrating the text message receiving method according to the embodiment of the present disclosure.

FIG. 3 is an extended flowchart illustrating the text message receiving method of this example.

In Step S301, it is detected whether the text message sent from the second electronic device is received when the first electronic device is in a first state.

In Step S302, the first display unit is controlled to display the text message at a first predetermined position in the first interface when the text message sent from the second electronic device is received.

A maximum number of bytes of the text message displayed in the first interface at one time can be set, and given that, the maximum number of bytes is 100. If the number of bytes of the text message sent from the second electronic device is more than 100, the user of the first electronic device can view in the first interface the content of 100 bytes in the text message, and at this time the user can look up the remaining text of the second text message by scrolling the text message content.

In Step S303, displaying of the text message in the first interface is terminated when an instruction for performing a predetermined operation on the text message is not received within a predetermined period of time.

In Step S304, a unread message prompt is displayed at a second predetermined position of the first interface.

When the first interface does not display the text message, the unread message prompt can be displayed at the second predetermined position. If the first interface displays a text message input button, then the second predetermined position may be the text message input box. The embodiment of the present disclosure does not make particular limitations to the specific position of the second predetermined position. When the user clicks the second predetermined position, the first interface would display the corresponding text message, or display the text message and the text message input box. After the user has looked up, the unread message prompt at the second predetermined message may disappear.

It can be understood that the text message can be displayed at any position in the first interface. When the first electronic device receives a plurality pieces of the text message sent from the second electronic message, if all the text message is displayed in the first interface, then the content displayed in the first interface will be covered, and thereby the first interface may only display the text message received at the current last time by the first electronic device. For example, the current time is 2:00 p.m., and the first electronic device received a piece of text message at 1:59:55 p.m., receives a piece of text message at 1:59:50 p.m., does not receive any text message from 1:59:50 p.m. to 1:59:55 p.m., and does not receive any text message sent from the second electronic device from 1:59:55 p.m. to 2:00 p.m., then only the text message received at 1:59:55 p.m. by the first electronic device is displayed in the first interface.

Figure 4:
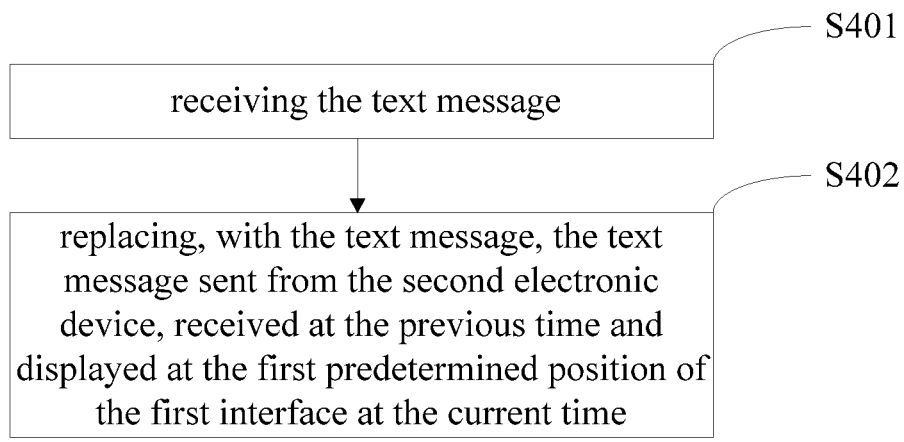
FIG. 4 is another extended flowchart illustrating the text message receiving method according to the embodiment of the present disclosure.

FIG. 4 is a method flowchart illustration an implementation of controlling the first display unit to display the second text message at the first predetermined position in the first interface in the text message receiving method of the example.

In Step S401, the text message is received.

At this time, the received text message may be the text message received at 1:59:55 p.m.

In Step S402, the text message is used to replace the text message sent from the second electronic device, received at the previous time and displayed at the first predetermined position in the first interface at the current time.

The text message received at the previous time may be the text message received at 1:59:50 p.m.

In a case of the first electronic device being in the first state, the user can look up historical text message records with the second electronic device. At this time, the text message receiving method in this example can further comprise controlling the first display unit to display all of the text messages received in a case of the first electronic device being in the first state when an instruction for looking up the historical text message records is received.

The historical text message records can be the text message records produced in the process of the current call between the first electronic device and the second electronic device. If besides the current call, the first electronic device makes plural calls with the second electronic device, then the historical text message can also comprise the historical text message records produced in the process of all calls. The embodiment of the present disclosure does not make particular limitations thereto.

There are many kinds of methods for the first electronic device to generate an instruction for looking up the historical text message records. The embodiment of the present disclosure provides the following method but not limited thereto.

If the first electronic device is an electronic device with a touch screen, then there may be a button for looking up the historical text message records in the first interface. The instruction for looking up the historical text message records can be generated once the user touches this button. At this time, the instruction for looking up the historical text message records is that the button for looking up the historical text message records is touched. Alternatively, a corresponding relationship between a touch track and the instruction for looking up the historical text message records is preset in the first electronic device. When it is detected that the track of the user touching the touch screen is a predetermined touch track, the instruction for looking up the historical text message records is generated. At this time, the instruction for looking up the historical text message records is that the track of the user touching the touch screen is the predetermined touch track. The touch track may be "o", "√" or "X" and the like. The specific forms of the touch track do not affect the implementation of the embodiment of the present disclosure, and thus particular limitations are not limited thereto.

If the first electronic device is an electronic device with entity keys, then a corresponding relationship between a key or a combination of several keys and the instruction for looking up the historical text message records can be preset in the first electronic device. When the user presses a predetermined key or predetermined keys, the instruction for looking up the historical text message records is generated. At this time, the instruction for looking up the historical text message records is that the predetermined key is pressed or the predetermined keys are pressed.

If the first electronic device is an electronic device with a camera, then a corresponding relationship between a user gesture and the instruction for looking up the historical text message records can be preset in the first electronic device. The instruction for looking up the historical text message records is generated when it is detected that the user gesture is a predetermined gesture. At this time, the instruction for looking up the historical text message records is that the user gesture is the predetermined gesture. The predetermined gesture may be "√" or "X" and the like. The specific forms of the predetermined gesture do not affect the implementation of the embodiment of the present disclosure, and thus particular limitations are not limited thereto.

When the text message is displayed in the first interface, the user can make the first interface display the text message and the text message input box through clicking the text message. When the user clicks the text message, the first display unit may not display the first interface, but only display the text message and the text message input box. If the text message and the text message input box are called as a second interface, then the first display unit is controlled to be switched from the first interface to the second interface when the user clicks the text message. The text message receiving method of this example can further comprise controlling the first display unit to display the text message and the text message input box when the instruction for performing the predetermined operation on the text message is received.

In actual applications, the text message can be dynamically displayed in the first interface.

Figure 5:
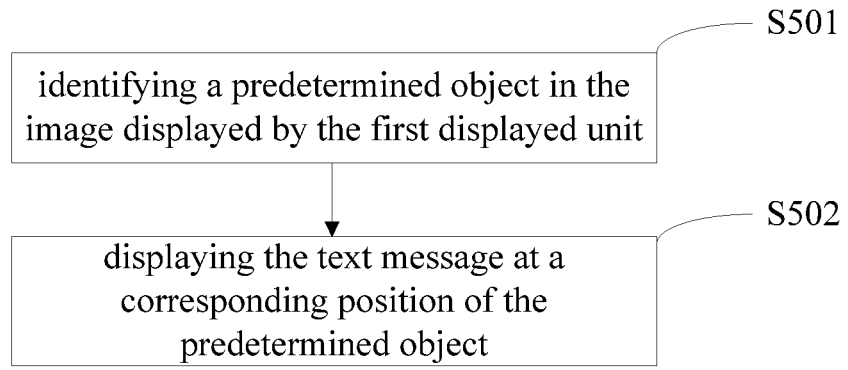
FIG. 5 is another extended flowchart illustrating the text message receiving method according to the embodiment of the present disclosure.

FIG. 5 is a method flowchart illustrating an implementation of displaying the text message at the first predetermined position of the first interface in the text message receiving method of this example.

In Step S501, a predetermined object is identified in an image displayed by the first displayed unit, i.e., a predetermined object is identified in the first area.

The image displayed by the first display unit may be an image of head, hands, and the like of the user of the second electronic device.

In Step S502, the text message is displayed at a corresponding position of the predetermined object, that is, the corresponding position of the predetermined object is determined as the second area, and the text message is displayed in the second area.

For example, assuming that the first electronic device is being in video communication with the second electronic device. The first interface of the first electronic device displays the images sent from the second electronic device and acquired by an image acquisition unit of the second electronic unit, wherein the images comprise a face image of the user of the second electronic device. When the user of the second electronic device sends a piece of text message to the first electronic device, the text message can be displayed at the lip position of the head image of the user of the second electronic device.

The above are descriptions of the information processing method according to the embodiment of the present disclosure at the receiving side by referring to FIGS. 1-5. Below will be descriptions of the information processing method at the sending side by referring to FIGS. 6-8.

Figure 6:
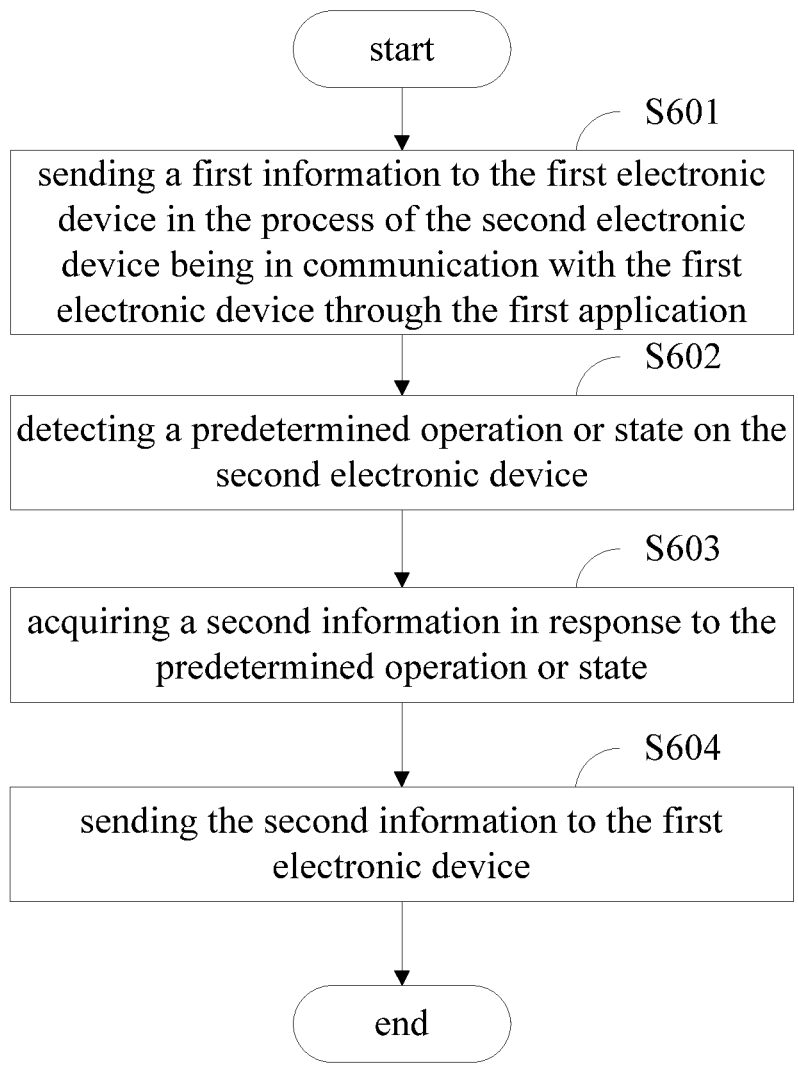
FIG. 6 is a flowchart illustrating an information processing method according to another embodiment of the present disclosure.
Figure 7:
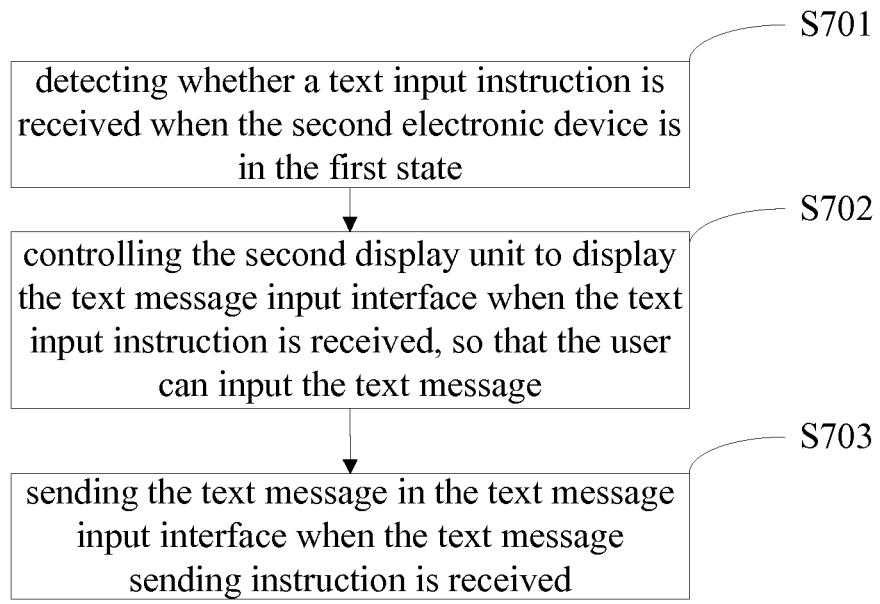
FIG. 7 is a flowchart illustrating a text message sending method according to another embodiment of the present disclosure.

That is, in the flowchart as shown in FIG. 6, the information processing method according to the embodiment of the present disclosure is applicable to the second electronic device described above. Being the same as the first electronic device, the second electronic device also comprises a first application. The first application has a communication function.

In step S601, the information processing method sends a first information associated with the first application to the first electronic device in the process of the second electronic device being in communication with the first electronic device through the first application. The first information comprises the communication information described above.

Next, in step S602, the information processing method detects a predetermined operation or state on the second electronic device, and acquires a second information in response to the predetermined operation or state in step S603.

In particular, in an embodiment, the display interface of the first interface is set with a predetermined control (button). When it is detected that the second user triggers the control, the information processing method for example requests the user to provide the second information. The information processing method for example may receive the second information manually input by the user or loaded from a local memory of the second electronic device.

Thus, the information processing method enables the user to share information with the communication counterparty user conveniently through the interface of the communication application per se in the process of communication.

In another embodiment, when content from other applications (such as system-level application or a second application being different from the first application) in a particular manner is detected, the information processing method obtains the content of the other applications in response to a dragging action of the user as the second information. For example, when it is detected that the second user drags for example a document on the desktop into the display window of the first application for example in a manner of dragging, the information processing method obtains the document as the second information.

Thus, the information processing method enables the user to share information with the communication counterparty user through the interface of the communication application per se in a manner complying with the user's operating habits in the process of communication.

In another embodiment, the second electronic device further comprises the second application being different from the first application, and the second application is in an active state. Thus, when the first application is in the active state, the information processing method detects the predetermined operation performed by the second user on the second application and acquires the second information from the second application in response to the predetermined operation. More particularly, for example, the second application may comprise a control for sharing the current content to the first application. When detecting that the second user triggers the control, the information processing method acquires the second information from the second application.

Below will be a description of a specific implementation mode of the information processing method according to the embodiment of the present disclosure with a specific example.

In particular, in this example, the second electronic device is in video communication with the first electronic device. The information processing method according to the embodiment of the present disclosure can be applicable to the second electronic device, and may be particularly used as a text message sending method. The second electronic device at least comprises a display unit and a communication unit. The display unit and the communication unit in the second electronic device are referred to as a second display unit and a second communication unit in order to be distinctive from those in the first electronic device. The second electronic device can establish a communication connection with the first electronic device through the second communication unit, As shown in FIG. 7, in step S701, it is detected whether the text input instruction is received when the second electronic device is in the first state, wherein the first state is an interactive state in which the first electronic device is in video communication with the second electronic device.

The video communication interactive state can comprise a first substate and a second substate. The first substate is a state in which a video communication connection has been established between the first electronic device and the second electronic device. Data comprising at least one of voice or image can be transmitted between the first electronic device and the second electronic device. The second substate is a state in which a video call request is sent to the second electronic device and a video call is waited to be established with the second electronic device.

There are many kinds of methods for the second electronic device to generate a text input instruction. The embodiment of the present disclosure provides the following several generating method but not limited thereto.

A first icon can be displayed in the second display unit of the second electronic device when the second electronic device is in the first state. If it is necessary to perform a text message interaction, the user may perform a predetermined operation on the first icon. For example, if the second electronic device has a touch screen, said "performing the predetermined operation on the first icon" may be touching the first icon. At this time, the text input instruction is performing the predetermined operation on the first icon.

If the second electronic device has a camera, then a corresponding relationship between the user gesture and the generation of the text input instruction can be set, that is, the text input instruction is generated when it is detected that the user gesture is the predetermined gesture. At this time, the text input instruction is that the user gesture is the predetermined gesture.

If the second electronic device has a touch screen, then a corresponding relationship between a track of the user touching the touch screen and the text input instruction can be set, that is, the text input instruction is generated when it is detected that the track of the user touching the touch screen is a predetermined track. At this time, the text input instruction is that the track of the user touching the touch screen is the predetermined track.

If the second electronic device has a keyboard, then a corresponding relationship between a key or a combination of several keys and the text input instruction can be set, that is, the text input instruction is generated when it is detected that a predetermined key is pressed or predetermined keys are pressed. At this time, the text input instruction is that the predetermined key is pressed or the predetermined keys are pressed.

If the network state of the current network for the second electronic device is so poor that the communication between the first electronic device and the second electronic device is affected, the text input instruction can be generated at this time, and thereby the method for generating the text input instruction can comprise detecting the current network state of the second electronic device, and generating the text input instruction when the current network state of the second electronic device does not satisfy a predetermined condition. At this time, the text input instruction is that the current network state of the second electronic device does not satisfy the predetermined condition.

Further, the second display unit can also be controlled to display a prompt of "poor network state" when it is detected that the network state for the second electronic device does not satisfy the predetermined condition, so that the user can determine whether to perform the text message interaction according to the actual situation, or the second display unit can be controlled to display a prompt box of "the network environment is poor, please turn off the video communication interaction interface for the time being and keep the voice call", the prompt box can be set with an OK button or a Cancel button. When the user clicks the OK button, the second electronic device will turn off the video communication interaction interface and keep the voice call; when the user clicks the Cancel button, the second electronic device will return to the video communication interaction interface. The video communication interaction interface corresponds to the first state.

In Step S702, the second display unit is controlled to display the text message input interface when the text input instruction is received, so that the user can input the text message.

The text message is collectively referred to as the text message input by the user of the second electronic device, instead of particularly referring to a piece of text message.

Given that, the second electronic device is a mobile phone, which is in a state being in video communication interaction with the first electronic device, and the second electronic device is in a horizontal screen state. When the second display unit displays the text message input interface, the screen of the mobile phone can be transferred from the horizontal screen into a vertical screen. At this time, a part of the screen of the mobile phone displays an interface corresponding to the first state, and a part of the screen of the mobile phone displays the text message input interface. Of course, the screen of the mobile phone may not be transferred from the horizontal state into the vertical state, and the mobile phone may not display the interface corresponding to the first state, and only displays the text message input interface. The embodiment of the present disclosure does not make particular limitations thereto.

The text message input interface may comprise a send button. When the user does not input any message in the text message input interface, the send button is in a non-active state (i.e., being unable to be used), or a prompt of "null message cannot be sent" will be popped up when the user clicks this send button.

The text message input interface may further comprise an exit button. When it is unnecessary to perform the text message interaction, the user can click the exit button to exit from the text message input interface.

The method for exiting from the text message input interface may also be a mode of the mobile phone exiting from a short message editing interface in the prior art, which is a prior art, thus details omitted herein.

The embodiment of the present disclosure can further set a maximum number of the bytes input in the text message input box. Of course, the number may not be limited. Alternatively, it can be set as a maximum height of the text message input box (given that the number of bytes presented under the maximum height of the text message input box is 50). If the number of bytes input by the user of the second electronic device is too much (exceeding 50 bytes) and the user needs to look up the content of message input by himself/herself, then the user can look up the text by scrolling the content in the text input box. In addition, the maximum height of the text message input box may not be set.

In Step S703, the text message in the text message input interface is sent when the text message sending instruction is received.

There are many kinds of methods for the second electronic device to generate the text message sending instruction. The embodiment of the present disclosure provides the following generating methods but not limited thereto.

If the second electronic device is an electronic device with a touch screen, then there may be a sending message button in the first interface. The text message sending instruction can be generated once the user touches this sending message button. At this time, the text message sending instruction is that the sending message button is touched. Alternatively, a corresponding relationship between a touch track and the text message sending instruction is preset in the second electronic device, and the text message sending instruction is generated when it is detected that the track of the user touching the touch screen is a predetermined touch track. At this time, the text message sending instruction is that the track of the user touching the touch screen is the predetermined touch track. The touch track may be "○", "√" or "X" and the like. The specific forms of the touch track do not affect the implementation of the embodiment of the present disclosure, and thus particular limitations are not limited thereto.

If the second electronic device is an electronic device with entity keys, then a corresponding relationship between a key or a combination of several keys and the text message sending instruction can be preset in the second electronic device. When the user presses a predetermined key or predetermined keys, the text message sending instruction is generated. At this time, the text message sending instruction is that the predetermined key is pressed or the predetermined keys are pressed.

If the second electronic device is an electronic device with a camera, then a corresponding relationship between a user gesture and the text message sending instruction can be preset in the second electronic device. The text message sending instruction is generated when it is detected that the user gesture is a predetermined gesture. At this time, the text message sending instruction is that the user gesture is the predetermined gesture. The predetermined gesture may be "√" or "X" and the like. The specific forms of the predetermined gesture do not affect the implementation of the embodiment of the present disclosure, and thus particular limitations are not limited thereto.

In the text message sending method of this example, in a case that the second electronic device is in an interactive state in which the second electronic device is in video communication with the first electronic device, it is detected whether the text input instruction is received. The second display unit in the second electronic device is controlled to display the text message input box when the text input instruction is received, so that the user inputs a text message, and the text message in the text message input box is sent when the text message sending instruction is received. When the text input instruction is received, the video communication interactive state between the second electronic device and the first electronic device is not ended, but the second display unit is controlled to display the text message input box, such that the user directly inputs the text message in the text message input box. Then, the text message input by the user is sent once the text message sending instruction is received, so as to realize the purpose of sending the text message without exiting from the video communication interactive state. After the sending of the first text message is completed, it is not needed to reestablish the video communication connection, thus simplifying the operation.

It can be understood that, the second electronic device can switch the first interface displayed by the second display unit to the text message input interface when the text input instruction is received. Alternatively, the second electronic device can display the text message input interface on the interface displayed by the second display unit when the text input instruction is received.

Figure 8:
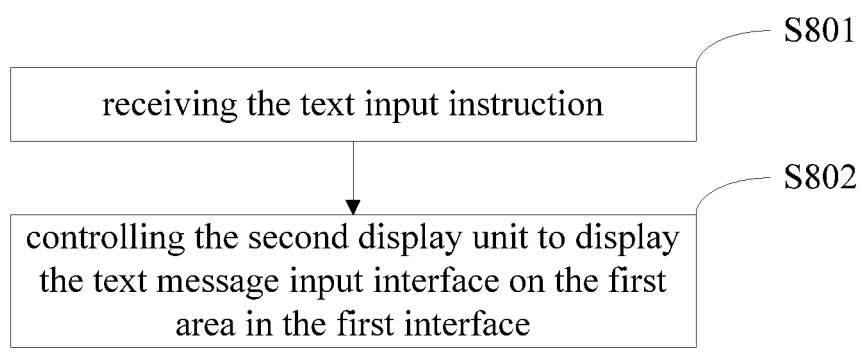
FIG. 8 is another flowchart illustrating the text message sending method according to said another embodiment of the present disclosure.

FIG. 8 is a method flowchart illustrating an implementation mode of controlling the second display unit to display the text message input box when the text input instruction is received in the text message sending method.

In Step S801, the text input instruction is received.

In Step S802, the second display unit is controlled to display the text message input interface in the first area of the first interface.

The first interface is the video communication interactive interface corresponding to the first state. The first area in the first interface displays the message input interface while other areas in the first interface display the interface corresponding to the first state.

Thus, the information processing method enables the user, in the process of communication, to simultaneously utilize applications other than the communication application and conveniently share information with the communication counterparty user through the other applications.

The above is the description of the information processing method according to the embodiment of the present disclosure. Below will be a description of the information process apparatus according to the embodiment of the present disclosure by referring to FIGS. 9-10.

The information process apparatus of the embodiment of the present disclosure is applicable to a first electronic device. The first electronic device at least comprises a display unit and a communication unit, and the display unit and the communication unit in the first electronic unit are referred to as a first display unit and a first communication unit in order to be distinctive from those in the second electronic device, and the first electronic device comprises a first application.

Figure 9:
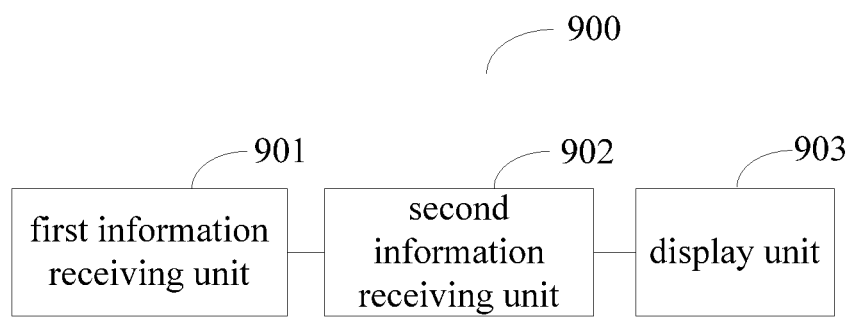
FIG. 9 is a block diagram illustrating major configurations of an information processing apparatus according to an embodiment of the present disclosure.

In particular, as shown in FIG. 9, the information processing apparatus 900 according to the embodiment of the present disclosure comprises a first information receiving unit 901, a second information receiving unit 902, and a display unit 903. The first information receiving unit and the second information receiving unit may be comprised in the first communication unit or may be independent from the first communication unit.

The first information receiving unit 901 receives a first information sent from the second electronic device and associated with the first application in a process of the first electronic device being in communication with a second electronic device through the first application. The second information receiving unit 902 receives a second information sent from the second electronic device. The display unit 903 displays the first information and the second information; wherein the first information is different from the second information, the first information includes communication information, and the second information includes information acquired by the second electronic device being in response to a detection of a predetermined operation or state on the second electronic device.

In an embodiment, the second electronic device comprises the first application and a second application being different from the first application, the second application being in an active state, and the second information is acquired from the second application by the second electronic device being in response to a detection of a predetermined operation performed by a user of the second electronic device on the second application.

In another embodiment, the information processing apparatus 900 may further comprise a third information receiving unit for receiving a third information sent from a server; wherein the display unit is further used for displaying the third information. Likewise, the third information receiving unit may be comprised in the first communication unit or may be independent from the first communication unit.

In another embodiment, the first information receiving unit 901 receives from the server the first information sent from the second electronic device to the server; further, the third information is generated by the server based on the first information.

In another embodiment, a display interface of the first application comprises a communication interface and an associated information interface, and the display unit 903 displays the first information in the communication interface of the first application and displays the second information and the third information in the associated information interface of the first application.

In another embodiment, the first information is communication image information continuously received from the second electronic device, and the second information is a text message received from the second electronic device; and the display unit 903 displays the communication image information in a first area of a display interface of the first application and displays the text message in a second area of the display interface of the first application, the second area is a subarea of the first area.

In another example, the display unit 903 further comprises a first determination unit for determining a first display parameter of a part of the communication image information in the second area; a second determination unit for determining a second display parameter of the text message according to the first display parameter, a difference between the second display parameter and the first display parameter exceeding a threshold; a first display subunit for displaying the communication image information according to the first display parameter; and a second display subunit for displaying the text message according to the second display parameter.

Figure 10:
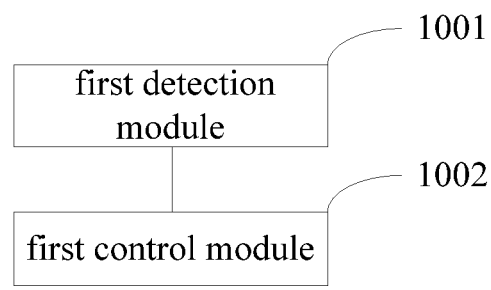
FIG. 10 is a schematic block diagram illustrating a text message receiving apparatus according to an embodiment of the present disclosure.

FIG. 10 is a schematic diagram illustrating a structure of a text message receiving apparatus provided in an embodiment of the present disclosure. The text message receiving apparatus can be applicable to a first electronic device. The first electronic device at least comprises a display unit and a communication unit. The display unit and the communication unit in the first electronic device are referred to as a first display unit and a first communication unit in order to be distinctive from those in the second electronic device. The first electronic device can establish a communication connection with the second electronic device through the first communication unit. The text message receiving apparatus may comprise a first detection module 1001 and a first control module 1002. The first detection module 1001 may be comprised in the first communication unit, or may be independent from the first communication unit. In addition, the first detection module 1001 may also be comprised in the second information receiving unit 902, or may be independent from the second information receiving unit 902. The first control module 1002 may be comprised in the first display unit, or may be independent from the first display unit.

The first detection module 1001 is used for detecting whether the text message sent from the second electronic device is received when the first electronic device is in the first state.

The first state is an interactive state in which the first electronic device is in video communication with the second electronic device.

The first control module 1002 is used for controlling the first display unit to display the text message at a first predetermined position of a first interface when the text message sent from the second electronic device is received.

The first interface is the video communication interactive interface corresponding to the first state.

The video communication interactive state comprises a first substate and a second substate. The first substate is a state in which a video communication connection has been established between the first electronic device and the second electronic device. Data comprising at least one of voice or image can be sent between the first electronic device and the second electronic device. The second substate is a state in which a video call request is sent to the second electronic device and a video call is waited to be established with the second electronic device. The video communication interactive interface comprises a video call interface corresponding to the first substate or a video call link request interface corresponding to the second substate.

In the text message receiving apparatus provided in the embodiment of the present disclosure, the text message sent from the second electronic device can be displayed in the video communication interactive interface. The user of the first electronic device can look up the text message sent from the second electronic device without exiting from the current video communication interactive interface, thus simplifying the operation steps.

The first control module in the text message receiving apparatus provided in the embodiment of the present disclosure can comprise a receiving unit for receiving the text message; a replacing unit for replacing, with the text message, the text message received at the previous time and displayed at the first predetermined position in the first interface at the current time.

The text message receiving apparatus provided in the embodiment of the present disclosure can further comprise a second control module for controlling the first display unit to display all of the text messages received by the first electronic device in a case of the first electronic device being in the first state when an instruction for looking up historical text message records is received. The second control module may be comprised in the first display unit, or may be independent from the first display unit.

There are many kinds of methods for the first electronic device to generate an instruction for looking up the historical text message records, please referring to the description of the text message receiving method for details, details omitted herein.

The text message receiving apparatus provided in the embodiment of the present disclosure can further comprise an operation receiving unit for receiving an instruction for performing a predetermined operation on the text message. The first display unit displays the text message and the text message input box when the operation receiving unit receives an instruction for performing a predetermined operation on the text message.

The text message receiving apparatus provided in the embodiment of the present disclosure can further comprise a pausing module for stopping displaying the text message in the first interface when an instruction for performing a predetermined operation on the text message is not received within a predetermined period of time; and a prompting module for displaying a unread message prompt at a second predetermined position of the first interface. The pausing module and the prompting module may be comprised in the first display unit, or may be independent from the first display unit.

The text message receiving apparatus provided in the embodiment of the present disclosure can further comprise an object identifying unit for identifying a predetermined object in the image (i.e., the first area) displayed by the first display unit and determining a corresponding position of the predetermined object as the second area. Then, the first display unit displays a second text message at the corresponding position of the predetermined object (i.e., the second area). The object identifying unit may be comprised in the first display unit, or may be independent from the first display unit.

Below will be a description illustrating the information processing apparatus of another embodiment of the present disclosure by referring to FIG. 11.

The information processing apparatus is applicable to a second electronic device. The second electronic device at least comprises a display unit and a communication unit. The display unit and the communication unit in the second electronic unit are referred to as a second display unit and a second communication unit in order to be distinctive from those in the first electronic device. In addition, the second electronic device further comprises a first application.

Figure 11:
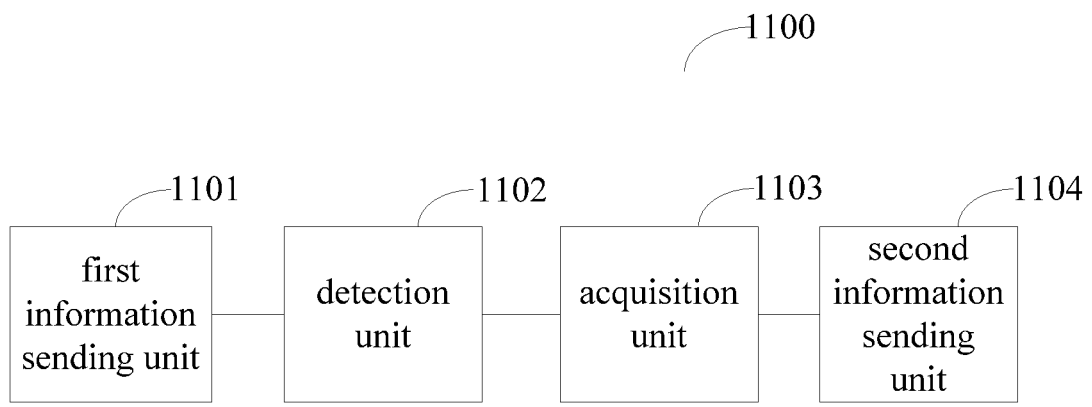
FIG. 11 is a block diagram illustrating major configurations of an information processing apparatus according to another embodiment of the present disclosure.

As shown in FIG. 11, the information processing apparatus 1100 of the embodiment of the present disclosure comprises a first information sending unit 1101, a detection unit 1102, an acquisition unit 1103, and a second information sending unit 1104. The first information sending unit and the second information sending unit may be comprised in the second communication unit or may be independent from the second communication unit.

The first information sending unit 1101 sends a first information associated with the first application to the first electronic device in a process of the second electronic device being in communication with the first electronic device through the first application. The detection unit 1102 detects a predetermined operation or state on the second electronic device. According to different needs for system designs, the detection unit 1102 may have a variety of different implementation forms.

The acquisition unit 1103 acquires a second information in response to the predetermined operation. The second information sending unit 1104 sends the second information to the first electronic device, wherein the first information is different from the second information, the first information includes communication information.

The second electronic device further comprises a second application being different from the first application, and the second application is in an active state.

For example, the detection unit 1102 detects a predetermined operation performed by the user of the second electronic device on the second application. The acquisition unit 1103 acquires the second information from the second application in response to the predetermined operation.

As described above, the detection unit can further detect other operation track or operation gesture of the user of the second electronic device. Alternatively, the detection unit can further detect a network state of the second electronic device.

Figure 12:
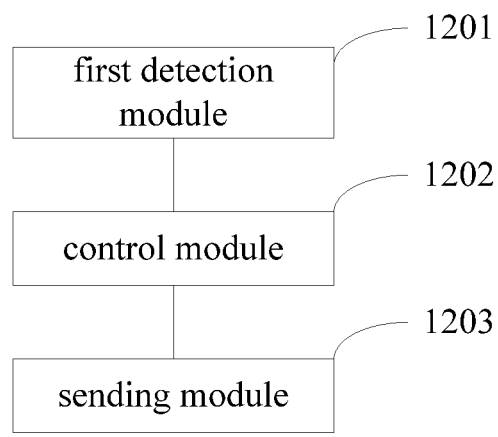
FIG. 12 is a schematic block diagram illustrating a text message receiving apparatus according to another embodiment of the present disclosure.

FIG. 12 is a schematic diagram illustrating a structure of a text message sending apparatus provided in an embodiment of the present disclosure. The text message sending apparatus is applicable to a second electronic device. The second electronic device at least comprises a display unit and a communication unit. The display unit and the communication unit in the second electronic device are referred to as a second display unit and a second communication unit in order to be distinctive from those in the first electronic device.

As shown in FIG. 12, the text message sending apparatus comprises a first detection module 1201, a control module 1202 and a sending module 1203.

The first detection module 1201 is used for detecting whether the text input instruction is received when the second electronic device is in the first state. The first detection module 1201 may be included as a part of the detection unit 1102.

Wherein the first state is a video communication interactive state, in which the first electronic device is in video communication with the second electronic device.

The video communication interactive state can comprise a first substate and a second substate. The first substate is a state in which a video communication connection has established between the first electronic device and the second electronic device. Data comprising at least one of voice or image can be sent between the first electronic device and the second electronic device. The second substate is a state in which a video call request is sent to the second electronic device and a video call is waited to be established with the second electronic device.

There are many kinds of methods for the first electronic device to generate a text input instruction, please referring to the description of the text message sending method for details, details omitted herein.

The control module 1202 is used for controlling the first display unit to display the text message input interface when the text input instruction is received, so that the user can input the text message. The control module 1202 may be comprised in the second display unit, or may be independent from the second display unit.

The sending module 1203 is used for sending the text message in the text message input interface when the text message sending instruction is received. The sending module 1203 may be comprised in the second information sending unit.

There are many kinds of methods for the first electronic device to generate a text sending instruction, please referring to the description of the text message sending method for details, details omitted herein.

In the text message sending apparatus of the embodiment of the present disclosure, in a case that the second electronic device is in a video communication interactive state in which the second electronic device is in video communication with the first electronic device, the first detection module 1201 detects whether the text input instruction is received. The second display unit in the second electronic device is controlled by the control module 1202 to display the text message input box when the text input instruction is received, such that the user can input the text message. The text message in the text message input box is sent by the sending module 1203 when the text message sending instruction is received. When the text input instruction is received, the video communication interactive state between the second electronic device and the first electronic device is not ended, but the second display unit is controlled to display the text message input box, such that the user directly inputs the text message in the text message input box. Then, the text message input by the user is sent once the text message sending instruction is received, so as to realize the purpose of sending the text message without exiting from the video communication interactive state. After the sending of the first text message is completed, it is not needed to reestablish the video communication connection, thus simplifying the operation.

Figure 13:
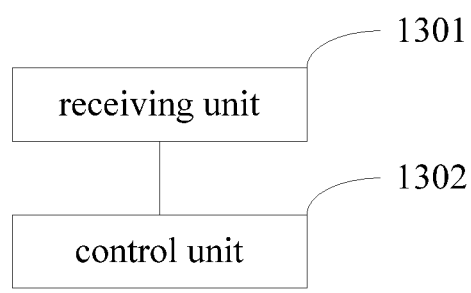
FIG. 13 is an extended schematic block diagram illustrating a text message receiving apparatus according to said another embodiment of the present disclosure.

FIG. 13 is a schematic diagram illustrating a structure of a control module in a text message sending apparatus provided in an embodiment of the present disclosure. The control module comprises a receiving unit 1301 and a control unit 1302.

The receiving unit 1301 is used for receiving the text input instruction.

There are many kinds of methods for the second electronic device to generate the text input instruction. The embodiment of the present disclosure provides the following methods but not limited thereto.

A first icon is displayed in the second display unit of the second electronic device when the second electronic device is in a first state. The text input instruction is performing a predetermined operation on the first icon.

The embodiment of the present disclosure can generate the text input instruction through a second detection module and a generation module. In particular, the second detection module is used for detecting a current network state of the second electronic device; and the generation module is used for generating the text input instruction when the current network of the second electronic device does not satisfy a predetermined condition.

The control unit 1302 is used for controlling the first display unit to display a text message input interface in a first area of a first interface.

The first interface is a video communication interactive interface corresponding to the first state.

The above is the description of the information processing apparatus according to the embodiment of the present disclosure.

As is known from the above that, the second electronic device can comprise the text message sending apparatus and/or the text message receiving apparatus, and when being in the first state, the second electronic device can either send a first text message to the first electronic device or receive a second text message from the first electronic device.

The information processing apparatus according to the embodiment in the present disclosure can receive communication information sent from the communication counterparty user in the process of communication as well as information being different from the communication information, for example, the shared information that the communication counterparty user wants to share, so as to realize the purpose of sharing information in the process of communication, thus enriching the user's experience in communication.

In addition, the information processing apparatus according to the embodiment of the present disclosure not only can receive the communication information sent from the communication counterparty user as well as the shared information shared by the communication counterparty user, but also can receive the associated information being suitable for the communication user and determined by the server's analysis on the communication information, so as to be able to utilize the communication information produced in the process of communication to realize the purpose of communication and further enhance the application value of the communication, thus greatly enriching the experience of the user.

More particularly, the information processing apparatus according to the embodiment of the present disclosure can utilize the communication information, for example, producing the information to which the user involved in the process of communication explicitly shows interest or is possible to shown interest, and provide the information to the user or another user having a particular relationship with the user, so as to provide a new manner of utilizing the communication information, which makes full use of the communication information, thus greatly enriching the user's experience.

Below will be a description of the application of the information processing method and the information processing apparatus according to the embodiments of the present disclosure in combination with two specific scenes by referring to FIGS. 14-15.

Figure 14:
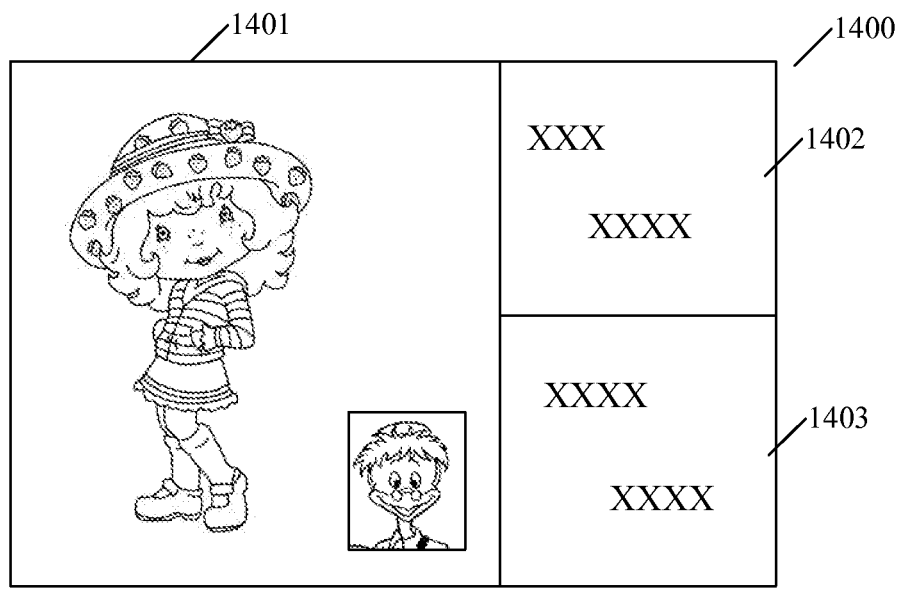
FIG. 14 is a schematic diagram illustrating a display of a first electronic device applying the information processing method according to an embodiment of the present disclosure.

FIG. 14 is a schematic diagram illustrating a display of a first electronic device applying the information processing method according to the embodiment of the present disclosure. As shown in FIG. 14, in the process of the first electronic device being in video communication with the second electronic device through the first application, the information processing method receives a first information (i.e., the so-called communication information) sent from the second electronic device, and displays the first information in an area 1401 (i.e., the so-called communication interface) of a display interface 1400 of the first application.

At this time, given that the first user of the first electronic device says to the second user of the second electronic device, "I like your coat very much." After having received the information of the first user, the second user decides to share associated information of the coat with the first user, such as information on a online store from which the second user purchases the coat. Thus, the second user can activate a second application while the first application is kept in an active state, for example, a client application or a general browser application corresponding to the online store, and click a button installed in the second application and used for sharing content to the first application. The information processing method being applicable to the second electronic device acquires information associated with the coat, i.e., the second information, from the second application in response to a detection of the predetermined operation of the second user, and sends this information to the first electronic device. Thus, the first electronic device displays the second information (i.e., the so-called shared information) in the area 1402 of the display interface 1400.

Thus, for a receiving side, the information processing method and the information processing apparatus according to the embodiment in the present disclosure can receive communication information sent from the communication counterparty user in the process of communication as well as information being different from the communication information, for example, the shared information that the communication counterparty user wants to share, so as to realize the purpose of sharing information in the process of communication, thus enriching the user's experience in communication.

In addition, for a sending side, the information processing method and the information processing apparatus according to the embodiment in the present disclosure not only can send the communication information to the counterparty user of the communication application in the process of communication, but also can send the shared information, in particular sending the shared information through activating the application being different from the communication application, thus greatly facilitating the user's operation.

In addition, on the other hand, the above words of the first user in the embodiment are forwarded to the second electronic device via a server, and thereby the server makes a semantic analysis on the communication information after having acquired it to determine that the processing object is the coat and the sending object is the first user. Then, the server acquires the associated information based on the processing object, for example, information on the coat of the same style and the like, as the third information. Later, the server sends the third information to the first electronic device. The first electronic device displays the third information in an area 1403 of the display interface 1400. The area 1402 and the area 1403 are jointly composed of the associated information interface.

Thus, the information processing method and the information processing apparatus according to the embodiment in the present disclosure can receive the associated information being suitable for the communication user and determined by the server through analyzing the communication information, so as to utilize communication information produced in the process of communication, which can achieve the purpose of communication, further enhance application value of the communication, and greatly enrich the user's experience.

In addition, as described above, the server can not only send the third information to the first user of the first electronic device, but also be configured to send the third information to for example friends of the first user and the like according to the user information stored in the server, so that the friends can for example conveniently satisfy the first user's preference according to the information.

Compared with the prior art which needs to guess the first user's preference or also needs to voluntarily collect information associated with the preference even if the first user's preference has been known, the information processing method according to the embodiment of the present disclosure provides a new mode of utilizing the communication information, which makes full use of the communication information, greatly simplifies the user's operation, saves the user's time and enriches the user's experience.

Figure 15:
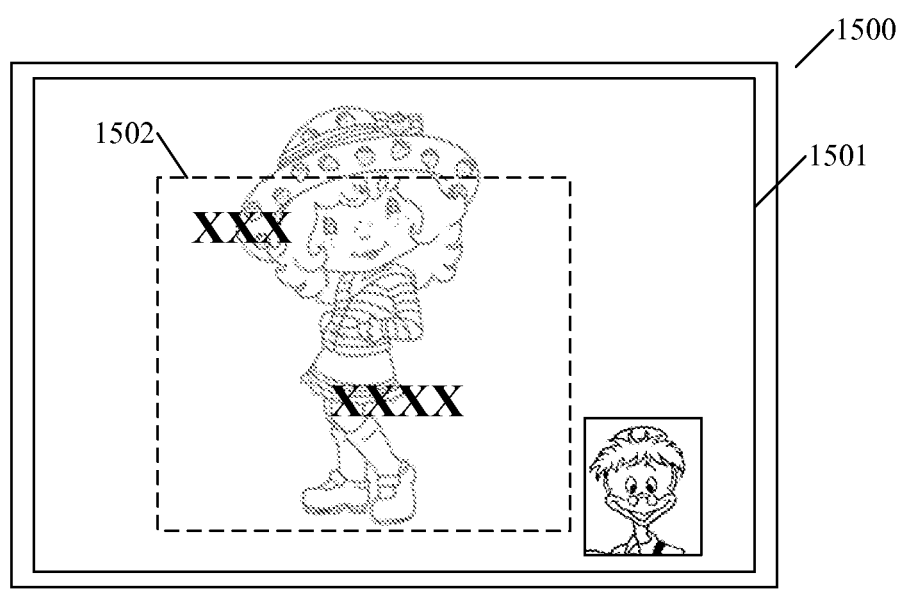
FIG. 15 is another schematic diagram illustrating a display of a first electronic device applying the information processing method according to an embodiment of the present disclosure.

FIG. 15 is another schematic diagram illustrating a display of a first electronic device applying the information processing method according to an embodiment of the present disclosure.

In FIG. 15, a display interface 1500 of the first electronic device comprises a first area 1501. The first area 1501 comprises a second area 1502 being as a subarea thereof.

In the process of being in video communication with the second electronic device, on one hand, the first electronic device continuously receives communication image information (i.e., first information) from the second electronic device and displays it in the first area 1501. On the other hand, the first electronic device receives text message (i.e., second information) from the second electronic device and displays it in the second area 1502.

Thus, in a case of a limited display area of the first electronic device or a limited display interface of the first interface of the first electronic device, the information processing method and the information processing apparatus according to the embodiment in the present disclosure can display a variety of types of information comprising the image information and the text message, thus improving the user's experience.

In addition, as illustratively shown in FIG. 15, further, the information processing method and the information processing apparatus according to the embodiment in the present disclosure can display the first information and the second information with different gray scales, such that the first information and the second information are displayed in an overlapped manner and can also be distinguished by the user clearly, thus further improving the user's experience.

It is needed to point out that the display interfaces as shown in FIGS. 14-15 are just for illustration. Those skilled in the art can design other various types of display interfaces according to the needs, which fall into the scope of the present disclosure.

The above are descriptions of the information processing method and the information processing apparatus according to the embodiments of the present disclosure by referring to FIGS. 1-15.

It is needed to specify that in the present specification, the terms of "comprise", "include" or any other variants intend to cover the meaning of non-exclusive containing, such that the process, method, object or apparatus comprising a series of elements not only comprise those elements but also comprise other elements not explicitly listed, or further comprise inherent elements for the process, method, object or apparatus. In a case of not having more limitations, the element defined by the expression of "comprising a" does not exclude that there are additional same elements in the process, method, object or apparatus comprising the element.

In addition, it is needed to be specify that in the present specification, the expressions such as "first . . . unit", "second . . . unit" are just for giving convenience to distinguish the descriptions, instead of meaning that it must be implemented as two or more physically-separated units. As a matter of fact, according to the needs, the unit as a whole may be implemented as one unit, or may be implemented as a plurality of units.

Last, it is further needed to specify that the series of processes not only comprise processes performed in time sequence according to the sequence described herein, but also comprise processes performed concurrently, or respectively, instead of in time sequence.

According to the descriptions of the above implementations, those skilled in the art can clearly know that the present disclosure can be implemented by means of software in combination with necessary hardware platform, and of course, it can be implemented only by means of hardware. Based on such understanding, all or part of the distributions made by the technical solutions of the present disclosure to the background art can be reflected in a form of a software product, and the computer software product can be stored in a storage medium such as ROM/RAM, a disk and the like, including several instructions for enabling a computer apparatus (may be a personal computer, a server, or a network apparatus and so on) to perform the method described in respective embodiments or some parts of the embodiments.

In the embodiments of the present disclosure, a unit/module can be implemented by software so as to be executed by various types of processors. For example, an identified executable code module can comprise one or more physical or logical blocks of the computer instructions. For example, it can be constructed as an object, a process, or a function. In spite of this, it is not necessary for identified executable code module to be physically located together, instead of comprising different instructions stored at different positions. When these instructions are combined together logically, they are composed of a unit/module and achieve a specified purpose of the unit/module.

In a case that the unit/module can be utilized by software, in view of the existing hardware process level, for the unit/module that can be utilized by software, those skilled in the art can construct a corresponding hardware circuit to realize the corresponding function without considering the cost. The hardware circuit comprises a conventional a very-large-scale integration (VLSI) circuit or gate array and existing semiconductors such as logical chip, transistor, or other discrete elements. The module can further be realized by using a programmable hardware device such as a field-programmable gate array, a programmable array logic, a programmable logic device and so on.

The above are detailed descriptions of the present disclosure. The present disclosure applies specific examples to explain the principles and implementations of the present disclosure, and the specification for the above embodiments are just used for understanding the method of the present disclosure and its core concept; in the meantime, for those ordinary skilled in the art, changes may be made to the specific implementation and application range according to the concept of the present disclosure. To sum up, the contents of the specification shall not be understood as limitations to the present disclosure. Respective embodiments of the present disclosure are described in detail. However, those skilled in the art should understand that various modifications, combinations or sub-combinations can be made to the embodiments without departing from the principle and scope of the present disclosure, and such modifications, combinations or sub-combinations should be considered as falling into the scope of the present disclosure.

What is claimed is:

1. An information processing method applicable to a first electronic device comprising a first application, comprising:
   receiving a first information sent from a second electronic device and associated with the first application in a process of the first electronic device being in communication with the second electronic device through the first application;
   receiving a second information sent from the second electronic device; and
   displaying the first information and the second information in a display interface of the first application;
   wherein the first information is different from the second information, the first information includes communication information, and the second information includes information acquired from a second application by the second electronic device being in response to a detection of a predetermined operation performed by a user of the second electronic device on the second application, when the first application is also in an active state, the second application differs from the first application and is in an active state in the second electronic device, wherein the first application and the second application send information to same sending object;

wherein the first information is communication image information continuously received from the second electronic device, and the second information is a text message received from the second electronic device; and the second information is acquired as a text message input by the user, wherein when a current network state of the second electronic device detected by the second electronic device does not satisfy a predetermined condition, the user can determine whether to turn off the communication image information and keep voice call, and whether to input the text message or not according to the current network state through a prompt box displayed on the second electronic device;

wherein said displaying the first information and the second information comprises:

displaying the communication image information in a first area of a display interface of the first application; and displaying the text message in a second area of the display interface of the first application, the second area being a subarea of the first area;

wherein said displaying the communication image information and the text message further comprises:

determining a first display parameter of a part of the communication image information in the second area; determining a second display parameter of the text message according to the first display parameter, a difference between the second display parameter and the first display parameter exceeding a threshold; and displaying the communication image information according to the first display parameter, and displaying the text message according to the second display parameter, wherein the first display parameter and the second display parameter are one of: gray scale, illuminance, or transparency.

2. The information processing method as claimed in claim 1, further comprising:

receiving a third information from a server; and
displaying the third information,
wherein:
said receiving the first information comprises:
receiving from the server the first information sent from the second electronic device to the server.

3. The information processing method as claimed in claim 2, wherein the display interface of the first application comprises a communication interface and an associated information interface, and said displaying the first information, the second information and the third information comprises:
displaying the first information in the communication interface of the first application; and
displaying the second information and the third information in the associated information interface of the first application.

4. The information processing method as claimed in claim 1, after the text message is displayed in the second area of the display interface, further comprising:

displaying the text message and a text message input box when an instruction for performing a predetermined operation on the text message is received.

5. The information processing method as claimed in claim 1, wherein said displaying the text message in the second area of the display interface comprises:

identifying a predetermined object in the first area;
determining a corresponding position of the predetermined object as the second area; and
displaying the text message in the second area.

6. An information processing method applicable to a second electronic device comprising a first application, comprising:

sending a first information associated with the first application to a first electronic device in a process of the second electronic device being in communication with the first electronic device through the first application;

detecting a predetermined operation performed by a user of the second electronic device on a second application or state on the second electronic device when the first application is also in an active state, the second application being different from the first application and being in an active state in the second electronic device;

acquiring a second information from the second application in response to the predetermined operation or state; and sending the second information to the first electronic device;

wherein the first information is different from the second information, the first information includes communication information, and the first application and the second application send information to same sending object;

wherein the first information is communication image information, the second information is a text message input by the user;

wherein said detecting the predetermined operation or state on the second electronic device comprises:

detecting a current network state of the second electronic device; and producing a text input instruction when the current network state of the second electronic device does not satisfy a predetermined condition, wherein the user determines to turn off the communication image information and keep voice call, and input the text message and produces the text input instruction according to the current network state through a prompt box displayed on the second electronic device;

wherein the communication image information is used to be displayed in a first area of a display interface of the first application of the first electronic device according to a first display parameter; and the text message is used to be displayed in a second area of the display interface of the first application of the first electronic device according to a second display parameter, the second area being a subarea of the first area, wherein the second display parameter is determined according to the first display parameter, a difference between the second display parameter and the first display parameter exceeds a threshold;

wherein the first display parameter and the second display parameter are one of: gray scale, illuminance, or transparency.

7. The information processing method as claimed in claim 6, wherein said acquiring the second information in response to the predetermined operation comprises:
displaying a text message input interface;
receiving a text message sending instruction; and
acquiring the text message input by the user on the text message input interface as the second information, wherein the first information is displayed in a first interface, and the first interface is a video communication interactive interface, and said displaying a text message input interface comprises: displaying the text message input interface in a first area of the first interface.

8. A first electronic device, comprising:

a processor; and a storage media with program codes of a first application and program codes of a second application different from the first application recorded thereon, when the program codes of the first application being executed by the processor, the storage media comprising:

a first information receiver for receiving a first information sent from a second electronic device and associated with the first application in a process of the first electronic device being in communication with the second electronic device through the first application;

a second information receiver for receiving a second information sent from the second electronic device; and a display unit for displaying the first information and the second information;

wherein the first information is different from the second information, the first information includes communication information, and the second information includes information acquired from the second application by the second electronic device being in response to a detection of a predetermined operation by a user of the second electronic device on the second application, when the first application is also in an active state, the second application is in an active state in the second electronic device, wherein the first application and the second application send information to same sending object;

wherein the first information is communication image information continuously received from the second electronic device, and the second information is a text message received from the second electronic device; and the second information is acquired as a text message input by the user, wherein when a current network state of the second electronic device detected by the second electronic device does not satisfy a predetermined condition, the user can determine whether to turn off the communication image information and keep voice call, and whether to input the text message or not according to the current network state through a prompt box displayed on the second electronic device;

wherein the display unit displays the communication image information in a first area of a display interface of the first application and displays the text message in a second area of the display interface of the first application, the second area being a subarea of the first area;

wherein, the processor is further configured to determine a first display parameter of a part of the communication image information in the first area; and determine a second display parameter of the text message according to the first display parameter, a difference between the second display parameter and the first display parameter exceeding a threshold;

the display unit further comprises: a first display subunit for displaying the communication image information according to the first display parameter; and a second display subunit for displaying the text message according to the second display parameter, wherein the first display parameter and the second display parameter are one of: gray scale, illuminance, or transparency.

9. The first electronic device as claimed in claim 8, further comprising a third information receiver for receiving a third information from a server;

the display unit is further used for displaying the third information.

10. The first electronic device as claimed in claim 9, wherein a display interface of the first application comprises a communication interface and an associated information interface, and the display unit displays the first information in the communication interface of the first application and displays the second information and the third information in the associated information interface of the first application.

11. The first electronic device as claimed in claim 8, the storage media has further program codes for receiving an instruction of performing a predetermined operation on the text message, wherein the program codes for receiving the instruction of performing a predetermined operation on the text message being executed by the processor, the storage media further comprising:

an operation receiver for receiving an instruction of performing a predetermined operation on the text message;

wherein the display unit displays the text message and a text message input box when the operation receiver receives the instruction for performing the predetermined operation on the text message.

12. The first electronic device as claimed in claim 8, wherein, the processor is further configured to identify a predetermined object in the first area and determine a corresponding position of the predetermined object as the second area.

* * * * *